Nov. 23, 1965 G. A. SHARMAN ETAL 3,219,830
PHOTOSENSITIVE APPARATUS FOR READING GRADUATED SCALES
Filed Sept. 6, 1960 4 Sheets-Sheet 1

GODFREY A. SHARMAN
AND JOHN A.B. SHARMAN
INVENTORS

BY Wenderoth, Lind & Ponack
ATTORNEYS

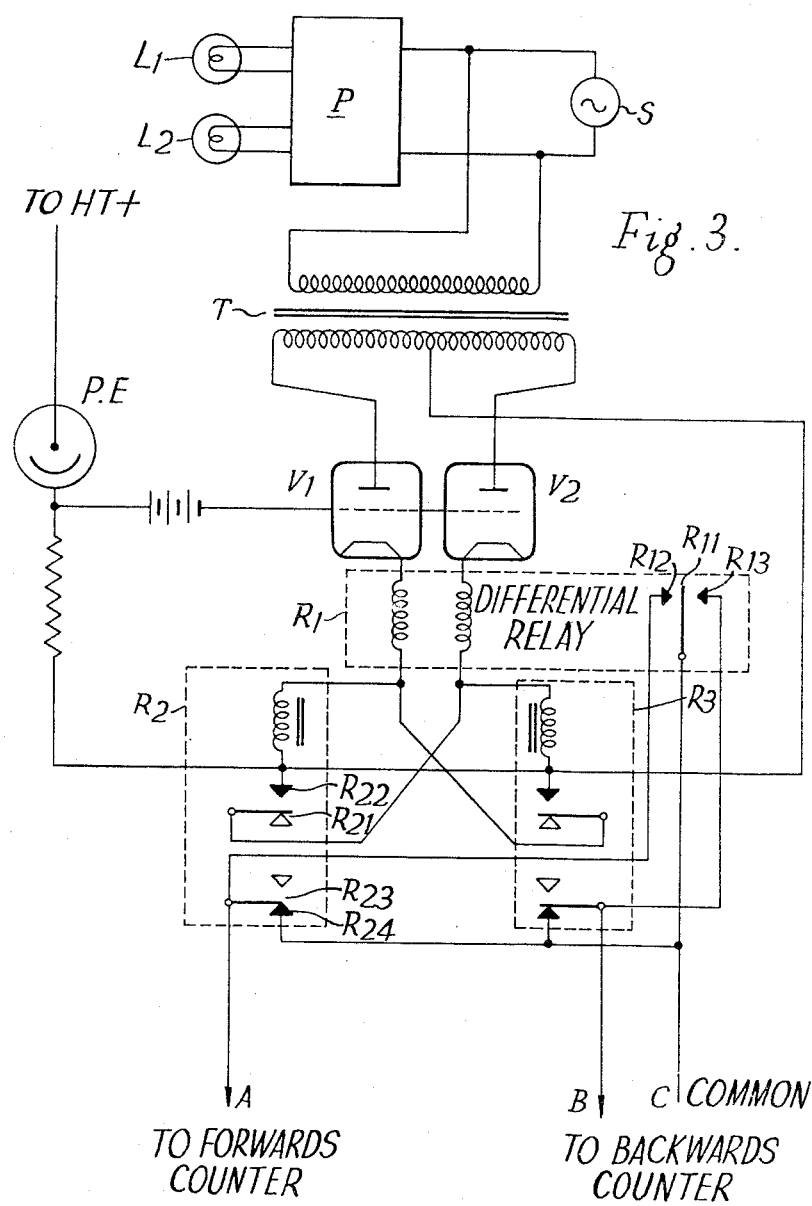

Nov. 23, 1965                G. A. SHARMAN ETAL                3,219,830
PHOTOSENSITIVE APPARATUS FOR READING GRADUATED SCALES
Filed Sept. 6, 1960                                    4 Sheets-Sheet 3

GODFREY A. SHARMAN AND
JOHN A. B. SHARMAN
INVENTORS

BY Wenderoth, Lind
and Ponack
ATTORNEYS

Nov. 23, 1965     G. A. SHARMAN ETAL     3,219,830
PHOTOSENSITIVE APPARATUS FOR READING GRADUATED SCALES
Filed Sept. 6, 1960     4 Sheets-Sheet 4

GODFREY A. SHARMAN
AND JOHN A.B. SHARMAN    INVENTORS

BY Wenderoth, Lind & Ponack
ATTORNEYS

United States Patent Office 3,219,830
Patented Nov. 23, 1965

3,219,830
PHOTOSENSITIVE APPARATUS FOR READING GRADUATED SCALES
Godfrey Alan Sharman, Caloggas, Epsom Road, and John Alan Brooke Sharman, 16 Gateways, Epsom Road, both of Guildford, England
Filed Sept. 6, 1960, Ser. No. 54,016
Claims priority, application Great Britain, Sept. 7, 1959, 30,533/59
11 Claims. (Cl. 250—237)

This invention relates to apparatus for reading graduated scales and is particularly concerned with arrangements which are required to measure and/or record with high precision the movement of such scales relative to other parts of the apparatus with which they are associated.

According to the present invention, the improved apparatus comprises means for reading a graduated scale simultaneously at spaced parts thereof and means providing a signal when a graduation or graduations on each part of the scale have been brought into coincidence with the reading means. By providing means for counting the signals thus provided, the movement and direction of movement of the scale relative to the reading means may be determined.

In a preferred form of the invention, the scale is divided into transparent and opaque, or reflecting and non-reflecting, portions and reading is effected by directing a beam of radiant energy in such manner that it impinges firstly on the one part of the scale, secondly on to the other part of the scale, and finally on to a detector.

According to a feature of the invention, and in order to enable the position of the scale to be estimated at any instant, the apparatus may also include means for interpolating between individual graduations.

In order that the invention may be understood some forms thereof which use optical systems with visible light will now be described by way of example although it is to be understood that the invention may be carried into effect using other forms of radiant energy.

Figure 1:
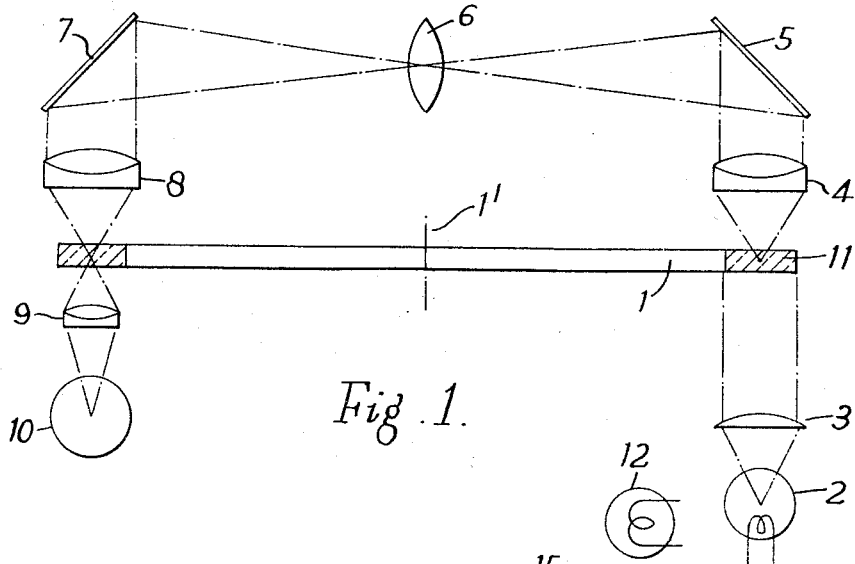
Figure 2:
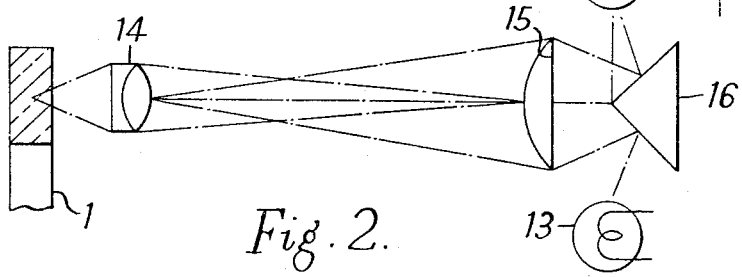
Figure 4:
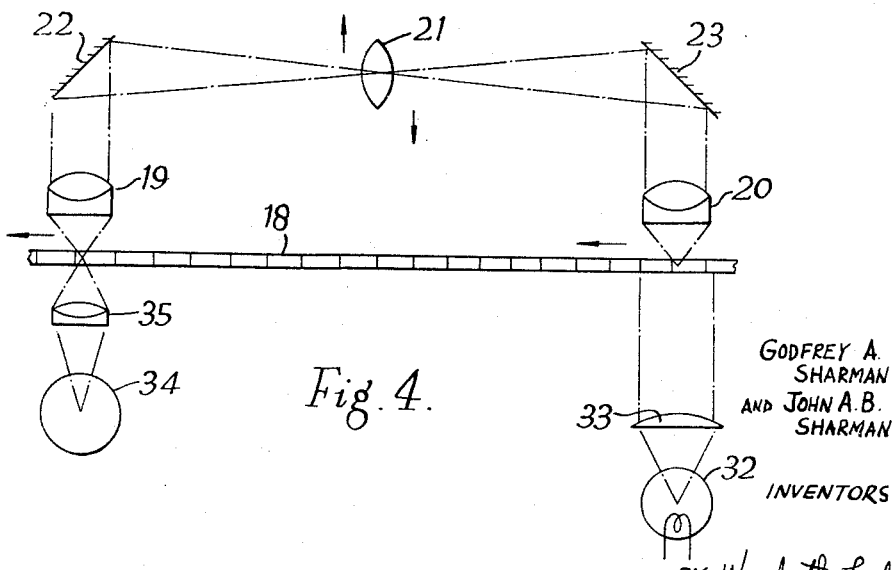
Figure 5:
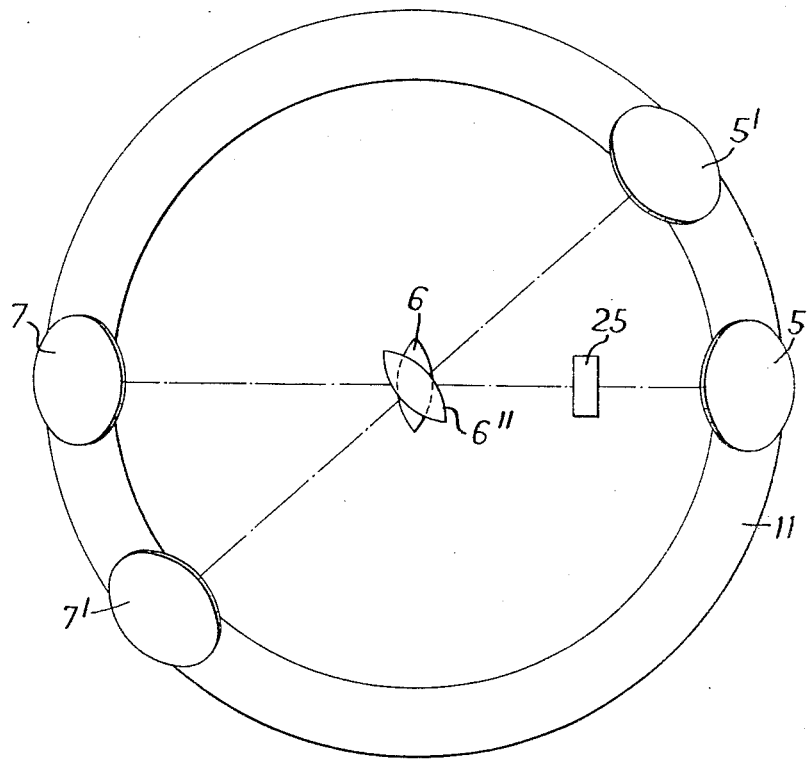
Figure 6:
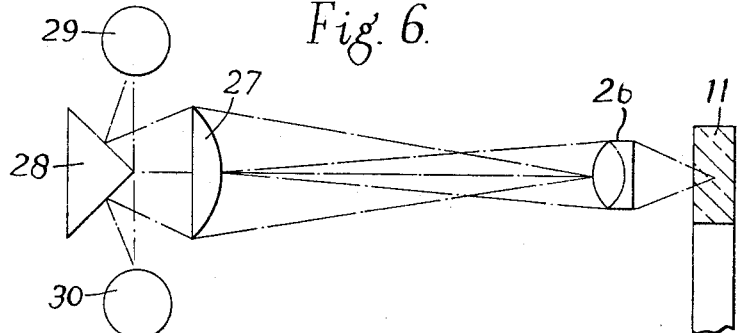
Figure 7:
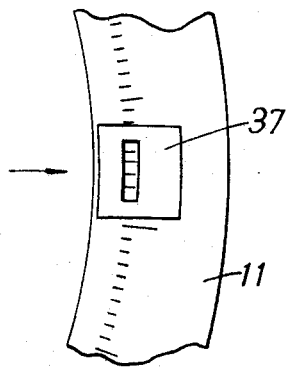
Figure 8:
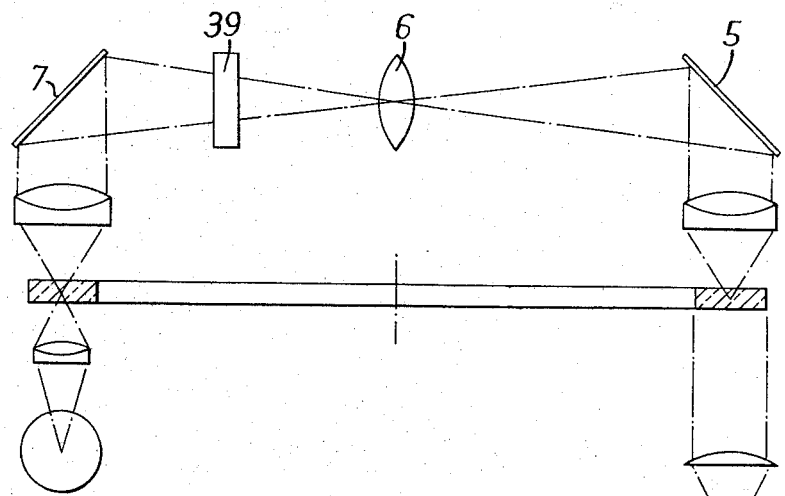

In the accompanying drawings:

FIGURE 1 illustrates schematically one form of the apparatus of this invention for reading circular scales, FIGURE 2 illustrates schematically part of a modification of the arrangement of FIGURE 1, FIGURE 3 is a circuit diagram of one form of electronic equipment for use with the apparatus of this invention, FIGURE 4 illustrates diagrammatically the application of the invention to the reading of linear scales, FIGURE 5 is a schematic plan view of a modified form of apparatus which uses two complete optical systems as shown in FIGURE 1, FIGURE 6 illustrates schematically a further modification of the arrangement of FIGURE 1, FIGURE 7 illustrates a masking arrangement for a circular scale to be read by the apparatus of FIGURE 1, and FIGURE 8 illustrates schematically a further modification of the apparatus to FIGURE 1.

Referring firstly to FIGURE 1, the apparatus there shown comprises a circular first part 1 which in use is rotatable about its centre 1' relative to a second or fixed part of the apparatus. The first part is formed or provided with a scale 11 consisting of a ring of graduations arranged on the peripheral edge of the part 1. The graduations may be arranged, for example, at each minute of arc and will be assumed to consist of transparent markings on an opaque ground, although opaque markings arranged on a transparent ground, or combinations of reflecting and non-reflecting markings, could equally well be used if desired.

Light from a source 2 is concentrated on a first portion of the scale 11 by a condenser 3 and the light passing through the scale is transmitted through objective 4, reflector 5, field lens 6, reflector 7 and objective 8 to a second and diametrically opposite portion of the scale through which the light passes and thence through objective 9 on to a photo cell 10, the source 2, lenses 3, 4, 6, 8 and 9, reflectors 5 and 7 and the photo cell 10 all forming part of the second and fixed part of the apparatus. The optical arrangement is such that the photo cell sees the image of the graduation or graduations on the first portion of the scale superimposed on the graduation or graduations on the second portion of the scale and the two will appear to move in opposite directions as the scale moves relative to the optical system. Consequently, the electrical output from the photo cell will be a maximum when the images of the graduations at opposite sides of the scale coincide and will be a minimum or zero when these images do not coincide. As the scale moves, therefore, the output of the photo-electric cell will consist of a series of pulses which, after amplification if necessary, may be counted in order to determine the angular movement of the scale.

In some applications where it is desired to sense position of the scale with great accuracy, the relatively small change in output from the photo cell when the images of the graduations are substantially coincident may be a disadvantage since it may be difficult to set the scale to give maximum output from the photo cell and/or the apparent position of coincidence may be dependent on the intensity of the light source, the sensitivity of the photo-electric cell and the amplifier gain.

To overcome this difficulty the invention further proposes to read the scale by means of two light beams which operate on different parts of the scale, which both traverse the (transparent) scale twice and are so arranged that as the images of the graduations illuminated by one beam move towards coincidence, the images of the graduations illuminated by the other beam are moving away from coincidence. With this arrangement the scale can be positioned very accurately by adjusting it until the energy in the two light beams is equal, this being a measurement which can be effected with precision.

Such arrangement may be carried into effect by the use of two complete optical systems mounted on the second part of the apparatus, each system being exactly as shown in FIGURE 1, the two systems being, however, angularly displaced about the axis 1' of rotation of the scale 11 as shown diagrammatically in plan in FIGURE 5 so that the two light beams illuminate first and second portions of the scale, that is the portions which lie under the reflectors 5 and 5' respectively.

It will be understood that in this embodiment the reflectors 5 and 7 of the first optical system are at a lesser height above the scale than the reflectors 5' and 7' of the second optical system to allow space for the two field lenses 6 and 6'.

In a practical form of this embodiment the two light beams are arranged to illuminate portions of the scale which are closely adjacent in which case although there are still separate light paths common optical components may be used. The phasing of the images of the two portions of the scale may be effected in several ways, for example by:

(a) Making the overall magnification from one side of the scale to the other very slightly different from unity (e.g. by moving the field lens 6 or 6' along the respective light path).

(b) By providing a parallel plate 25 (FIGURE 5) in the path of the rays forming the image of one portion of the scale and controlling its inclination so as to cause a lateral displacement. Conveniently this plate may be situated near the field lens 6.

(c) By introducing a prism or a reflector into the path of the rays forming the image of one portion of the scale so as to cause an angular displacement which is adjustable by movement of the prism or reflector.

Any of these three methods may be used as a means for producing a controlled shift of the image of the first illuminated portion of the scale relative to the image of the second illuminated portion of the scale.

Various arrangements of light source and photo-electric cells may be used in carrying out this form of the invention in order to enable the energy in the two light beams to be compared.

For example, two light sources and two photoelectric cells may be used as described above with reference to FIGURES 1 and 5, the outputs from the two cells being appropriately combined so that the outputs can be compared with one another. Alternatively two light sources may be used with a single photo cell. This embodiment uses the optical system of FIGURE 1 but with the light source 2 and condenser lens 3 replaced by the arrangement illustrated in FIGURE 2 and which is described below. In this embodiment the intensity of light from the two sources 12 and 13 (FIG. 2) may be modulated in opposite phase with the electrical output from the photo-electric cell 10 (FIGURE 1) switched in synchronism. This may conveniently be effected by supplying the light sources from a source of alternating current which is also used as a reference signal for a phase conscious rectifier to which the output of the photo-electric cell is applied, after amplification if necessary. The output from the phase conscious rectifier may be taken to a relay, a meter, a cathode ray tube or other equipment as desired.

By suitable interconnection of relays the direction of movement of the scale may also be determined. FIGURE 3 shows one suitable arrangement. In this arrangement alternating current from a source S is supplied to the two light sources $L_1$ and $L_2$ (the sources 12 and 13 of FIGURE 2) through a phase shifting arrangement P so arranged that the current in one light source is 90° out of phase with the current in the other light source. Current from the source S is also supplied to the primary winding of transformer T, the secondary winding of which is connected with the anode of valves $V_1$ and $V_2$ which form a phase conscious rectifier. The output from the photo-electric cell PE (10 in FIGURE 1) which receives light from both light sources $L_1$ and $L_2$ is applied to the grids of valves $V_1$ and $V_2$ connected in parallel. The two coils of a polarised differential relay $R_1$ are connected respectively in the cathode circuits of valves $V_1$ and $V_2$ and in series respectively with the operating coils of change-over relays $R_2$ and $R_3$. In operation, if, for example, the scale moves forward, the phasing of the light signal G is such that the photo-electric cell PE causes valve $V_1$ (say) to conduct before valve $V_2$. The polarised relay $R_1$ (being more sensitive than unpolarised change-over relays $R_2$ and $R_3$) immediately closes contacts $R_{11}$ and $R_{12}$. A little later relay $R_2$ becomes energised and closes contacts $R_{21}$ and $R_{22}$ to short-circuit the coil of relay $R_3$ and opens contacts $R_{23}$ and $R_{24}$ connected in parallel with contacts $R_{11}$ and $R_{12}$ of relay $R_1$. When the photo-electric signals from the two light paths become equal, the relay $R_1$ centralises to open contacts $R_{11}$ and $R_{12}$ and transmits a signal (in the form of a break in the circuit A to C) to the forwards counter. For movement of the scale in the opposite direction, the contacts $R_{11}$ and $R_{13}$ of differential relay $R_1$ close and relay $R_3$ shortly afterwards becomes energised to operate in the manner described above with reference to relay $R_2$. However, in this case the signal is transmitted to the reverse counter in the form of a break in the circuit B to C.

The two sources may conveniently be gas or vapour discharge lamps, filament lamps, fluorescent lamps or cathode ray tubes and the alternating current supply may be half wave rectified and the two sources fed from alternate half waves.

A convenient means of illuminating the two graduation marks or groups of marks when using two light sources is to make use of a modified Kohler microscope illuminating system. In this arrangement, as shown in FIGURE 2, the two sources 12 and 13 are imaged on to the back of the lens 14 by means of the condenser 15 after reflection at the surface of prism 16. The lens 14 then forms an image of the illuminated aperture of the condenser 15 on to the plane of the graduations of the scale 1.

One half of the condenser 15 then appears to be illuminated by the source 12 and the other half by the source 13 and each light path is thus illuminated by one light source only.

In an alternative system a single light source is used and the light transmitted by the two alternative light paths is caused to fall on two separate photo-electric cells or photo transistors. In this embodiment the optical system of FIGURE 1 is used but with the objective 9 and photo cell 10 replaced by the arrangement shown in FIGURE 6 wherein the objective 26 and condenser lens 27 transmit the light in the two light paths to the respective reflecting surfaces of prism 28 whence the light is reflected to the separate photo electric cells 29 and 30. With this system a steady illumination may be used if desired but this loses the advantage that an alternating current is better suited to amplification than a direct current.

In carrying the invention into effect, the graduated scale may be in the form of a "radial grating" (that is, it may be ruled with a large number of alternative opaque lines and clear spaces, accurately spaced and of approximately equal width) and "moiré fringes," which travel along the length of the graduation line, may be formed by arranging that the image that is projected on to the second portion or far side of the circle is rotated through a small angle with respect to the graduations on the scale. This rotation may readily be effected by rotating through a small angle either or both the reflectors 5 and 7 (FIG. 1) about the optical axis. With such a scale, if two separate light beams are used two light sources may be used to illuminate the inner and outer parts of the lengths of the graduation lines alternately and coincidence can be judged as before by equality of the signals from a single photo-electric cell.

All the above described arrangements may equally be used for reading linear scales. FIGURE 4 illustrates diagrammatically the elements of a suitable arrangement. As shown, light from a source 32 is projected by lens 33 onto a first portion of a scale 18 which is formed with transparent graduations. An image of the graduations of this portion of the scale is projected onto a second portion of the scale by means of objective 20, reflector 23, field lens 21, reflector 22 and objective 19, and light passing through this second portion is concentrated on photoelectric cell 34 by means of objective 35. It will be seen that if the scale 18 is moved relative to the objectives 19 and 20 the images of the graduations reflected on to the field lens 21 by reflecting surfaces 22 and 23 will move in opposite directions as indicated by the arrows. Hence the image formed by the lens 20 of the graduation which is opposite lens 19 will appear to move in the opposite direction to that in which the scale moves.

All the above described arrangements operate to generate an electric signal or pulse each time a scale moves through a distance determined by the spacing between two graduations. In some circumstances it may be convenient to make certain of the graduations longer than the rest, for example those representing units may all be of one length, those representing 10's may be longer and those representing 100's may be longer still, and by moving appropriate masks or shutters relative to the scale or images of the scale the number of signals or pulses per unit distance may be controlled.

One simple arrangement is illustrated diagrammatically in FIGURE 7 wherein a mask 37 is arranged on the scale 11 so that it can be moved radially as indicated by the arrow so as to uncover either the units, the tens of the hundreds' scale. If necessary two such movable masks suitably linked together could be provided, one arranged on the first and the other on the second portion of the scale in an arrangement as illustrated in FIGURE 1.

Besides being used to provide electrical signals at preset linear or angular intervals, the apparatus may be used to interpolate between graduations and so "measure" the position of the divided scale at any instant. For example when using the arrangement of FIGURE 1 such interpolation may be achieved, as shown in FIGURE 8, by interposing between either the reflector 7 and the field lens 6, or, equivalently, between the field lens 6 and the reflector 5, a parallel plate micrometer, as represented by the rectangle 39. Alternatively a travelling wedge micrometer or an inclinable reflecting face can be used so that the position of the image can be moved by a known and controlled amount.

The apparatus of the present invention may be used in any instrument such as theodolites, levels, sextants, goniometers, spectrometers, dividing heads, protractors, jig borers, etc., in which angular or linear measurements have to be effected with precision.

We claim:

1. Apparatus for reading a graduated scale comprising first means for projecting a first beam of radiant energy so as to impinge firstly on to a first portion of said scale and secondly on to a second portion of said scale, second means for projecting a second beam of radiant energy so as to impinge firstly on to a third portion of said scale and secondly on to a fourth portion of said scale, and means for comparing the energies in the first and second beams with each other after impingement of the respective beams on the said second and fourth portions of said scale.

2. Apparatus for reading a graduated scale comprising first means for projecting a first beam of radiant energy so as to impinge firstly on to a first portion of said scale and secondly on to a second portion of said scale, second means for projecting a second beam of radiant energy so as to impinge firstly on to a third portion of said scale and secondly on to a fourth portion of said scale, means for comparing the energies in the first and second beams with each other after impingement of the respective beams on the said second and fourth portions of said scale, and means for generating an electric signal when the energy in each said beam is equal.

3. Apparatus for reading a graduated scale comprising a source of radiant energy, means for dividing energy from said source into two beams, two detectors of radiant energy, means for directing each said beam such that it impinges firstly on one part of said scale, secondly on another part of said scale, and finally on a respective one of said detectors, and means for comparing the outputs of said detectors with each other.

4. Scale reading apparatus comprising a first part mounted for movement relative to a second part, a graduated scale mounted on said first part, said scale having a first portion and a second portion, means mounted on said second part for illuminating the first portion of said scale, means mounted on said second part for projecting an image of said illuminated first portion onto the second portion of said scale, photoelectric means mounted on said second part to receive light transmitted through said second portion of said scale whereby to generate electric signals when upon relative movement of said first and second parts the image of said first portion of the scale moves relative to said second portion of the scale, and means effective when said first and second parts are stationary to produce a controlled shift of said image relative to said second portion of said scale.

5. Scale reading apparatus comprising a first part mounted for movement relative to a second part, a graduated scale mounted on said first part, said scale having a first portion and a second portion, said scale comprising a series of alternate transparent and opaque lines of equal width, means mounted on said second part for illuminating the first portion of said scale, means mounted on said second part for projecting an image of the graduations of said illuminated first portion onto the second portion of said scale, said projecting means including means for rotating the image of said graduations by a small controlled angle relative to the graduations on said second portion of said scale, and photoelectric means mounted on said second part and positioned to receive light transmitted through said second portion of said scale.

6. Scale reading apparatus comprising a first part mounted for movement relative to a second part, a graduated scale mounted on said first part, said scale having a first portion and a second portion, means mounted on said second part for illuminating the first and second portion of said scale, optical means mounted on said second part for projecting an image of said first portion of said scale onto a third portion of said scale and an image of said second portion of said scale onto a fourth portion of said scale, and photoelectric means mounted on said second part for receiving light transmitted through said third and said fourth portions of said scale and for generating electric signals in response to relative variation of light transmitted through said third and said fourth portions when relative movement occurs between said first and second parts.

7. Scale reading apparatus according to claim 6 including separate light sources for illuminating said first and second portions of said scale, means coupled to said light sources for modulating the light output from each source, and a single photoelectric device receiving light from said third and said fourth portions of said scale.

8. Scale reading apparatus according to claim 6 including a common light source for illuminating said first and said second portions of said scale and separate photoelectric devices receiving light respectively from said third and said fourth portions of said scale.

9. Scale reading apparatus according to claim 6 including means for producing a controlled shift of the image of said first portion of said scale relative to the image of said second portion of said scale.

10. Scale reading apparatus according to claim 6 including first means coupled to said photoelectric means for counting electric impulses generated by said photoelectric means on relative rotation of said parts in one direction, and second means coupled to said photoelectric means for counting electric impulses generated by said photoelectric means on relative rotation of said parts in the opposite direction.

11. Scale reading apparatus comprising a first part mounted for movement relative to a second part, a graduated scale mounted on said first part, said scale including at least two series of graduations comprising transparent and opaque markings, said scale having a first portion and a second portion, means mounted on said second part for illuminating the first portion of said scale, optical means mounted on said second part for projecting an image of said illuminated first portion onto the second portion of said scale, and photoelectric means mounted on said second part to receive light transmitted through said second portion of said scale, and masking means movable relative to said portions of said scale for obstructing transmission of light through all but one of said series of graduations.

References Cited by the Examiner
UNITED STATES PATENTS

| | | | |
|---|---|---|---|
| 2,065,421 | 12/1936 | Bernarde | 250—231 |
| 2,203,706 | 6/1940 | Stockbarger | 250—237 |
| 2,375,665 | 5/1945 | Koulicovitch | 250—237 |
| 2,448,830 | 9/1948 | Robbins et al. | 250—220 X |
| 2,489,305 | 11/1949 | McLennan | 250—235 |
| 2,586,540 | 2/1952 | Holden | 250—231 |
| 2,670,651 | 3/1954 | Burns et al. | 88—14 |
| 2,861,345 | 11/1958 | Spencer | 250—237 |
| 2,916,826 | 12/1959 | Bower et al. | 250—233 X |
| 2,930,895 | 3/1960 | Kuehne | 250—220 X |
| 2,961,917 | 11/1960 | Werner | 250—231 X |
| 3,054,901 | 9/1962 | Davidson | 250—233 |

RALPH G. NILSON, *Primary Examiner.*

RICHARD M. WOOD, WALTER STOLWEIN,
*Examiners.*